United States Patent [19]
Korinsky et al.

[11] Patent Number: 6,027,191
[45] Date of Patent: Feb. 22, 2000

[54] CHASSIS FOR ELECTRONIC COMPONENTS

[75] Inventors: George Korinsky, Gig Harbor; Craig Crawford; Jennifer Colley, both of Kent; Anthony G. Picardo, Tacoma, all of Wash.

[73] Assignee: Intel Corporation, Santa Clara, Calif.

[21] Appl. No.: 09/329,426

[22] Filed: Jun. 10, 1999

Related U.S. Application Data

[62] Division of application No. 09/085,779, May 28, 1998, Pat. No. 5,964,513.

[51] Int. Cl.[7] .................................................. A47B 81/00
[52] U.S. Cl. ...................... 312/223.2; 312/263; 312/265.5
[58] Field of Search ................ 312/223.1, 223.2, 312/257.1, 263, 265.5, 265.6, 293.3; 361/724, 683, 725

[56] References Cited

U.S. PATENT DOCUMENTS

| | | | |
|---|---|---|---|
| 5,269,598 | 12/1993 | Liu | 361/725 X |
| 5,349,132 | 9/1994 | Miller et al. | 361/724 X |
| 5,397,176 | 3/1995 | Allen et al. | 312/223.2 |
| 5,491,611 | 2/1996 | Stewart et al. | 312/223.2 X |
| 5,542,757 | 8/1996 | Chang | 312/223.2 |
| 5,547,272 | 8/1996 | Paterson et al. | 312/265.5 X |
| 5,593,219 | 1/1997 | Ho | 312/263 |
| 5,593,220 | 1/1997 | Seid et al. | 312/223.2 X |
| 5,825,626 | 10/1998 | Hulick et al. | 312/223.2 X |
| 5,833,334 | 11/1998 | Harper | 312/265.6 X |
| 5,845,977 | 12/1998 | Neukam et al. | 312/263 X |
| 5,897,180 | 4/1999 | Singer | 312/223.2 X |

*Primary Examiner*—Peter M. Cuomo
*Assistant Examiner*—James O. Hansen
*Attorney, Agent, or Firm*—Trop, Pruner, Hu & Miles, P.C.

[57] ABSTRACT

A chassis which comprises a first frame and a second frame is provided. The first frame includes a front surface and a pair of first flanges formed on opposing edges of the front surface. The second frame includes a pair of side surfaces. Each side surface has an edge with a second flange and a plurality of aligned guide elements. The second flanges and the guide elements define guide channels for slidably receiving the first flanges. A cover assembly for the chassis comprises a panel having a first inner surface, a hook, and a standoff projecting from the first inner surface. The hook has a leg portion and an arm portion which may be inserted into a slot in one of the surfaces of the chassis.

7 Claims, 9 Drawing Sheets

CHASSIS FOR ELECTRONIC COMPONENTS

This is a division of prior application Ser. No. 09/085,779 filed May 28, 1998 now U.S. Pat. No. 5,964,513.

BACKGROUND

The invention relates generally to computers and other electronic assemblies and, more specifically, to a chassis for housing electronic components.

A computer system includes electronic components, such as a microprocessor, power supply, input/output devices, and memory chips, which are enclosed within a chassis. Usually the chassis has a bottom frame and a top frame which fits over the bottom frame. The electronic components are usually mounted on the bottom frame of the chassis and the top frame is secured to the bottom frame to enclose the electronic components within the chassis. Typically, a computer system that is not designed for portability or that is not constrained by space uses an oversized chassis. The oversized chassis eases the task of mounting the electronic components on the bottom frame of the chassis and allows subsequent addition of electronic components to the chassis.

Sometimes, it is desirable to have a high-performance computing system in the smallest possible form-factor. This often requires that the same electronic components that fit into a large chassis be fitted into a much smaller chassis. The electronic components may be attached to both the bottom frame and top frame of the chassis to allow the highest density packing possible while permitting sufficient air flow to cool the enclosed components. The electronic components may be so tightly packed that clearances between sensitive components are not more than a few hundredths of an inch. This kind of dense packing makes it difficult to attach the top frame of the chassis to the bottom frame of the chassis without damaging the electronic components. Thus it would be beneficial to have a chassis that would allow dense packing of electronic components without damaging the electronic components.

SUMMARY

In general, in one embodiment, a chassis comprises a first frame having a front surface and a pair of first flanges formed on opposing edges of the front surface and a second frame having a pair of side surfaces. Each side surface has an edge with a second flange and a plurality of aligned guide elements. The second pair of flanges and the guide elements define guide channels for slidably receiving the first pair of flanges.

In another embodiment, a cover assembly comprises a chassis and a panel. The chassis has a first surface and a slot formed in the first surface. The panel has an inner surface and a hook. The hook has a leg portion and an arm portion which is insertable into the first slot. A standoff projecting from the inner surface has a length that is longer than a length of the leg portion.

Other features of the invention will be apparent from the following description and the appended claims.

DETAILED DESCRIPTION

The following embodiments are illustrative only and are not to be considered limiting in any respect.

Figure 1:
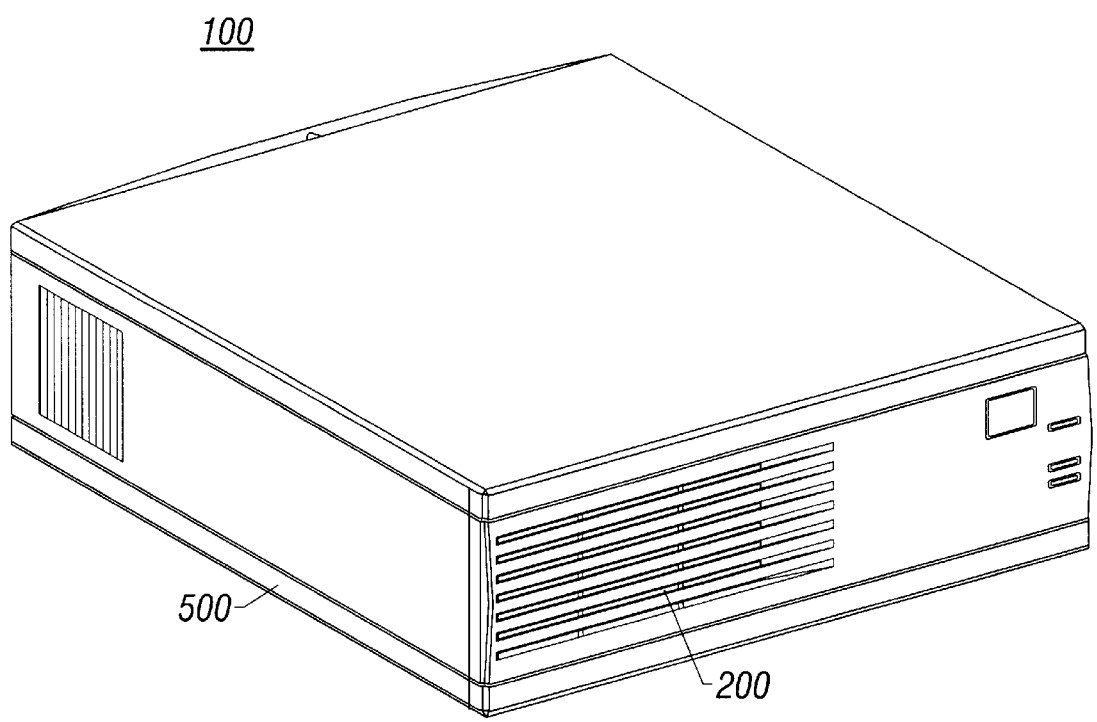
FIG. 1 is a perspective view of a computer system employing one embodiment of the invention.

Referring to FIG. 1, a computing system 100 includes a cover 500 and a chassis 200 enclosed within cover 500.

Figure 2:
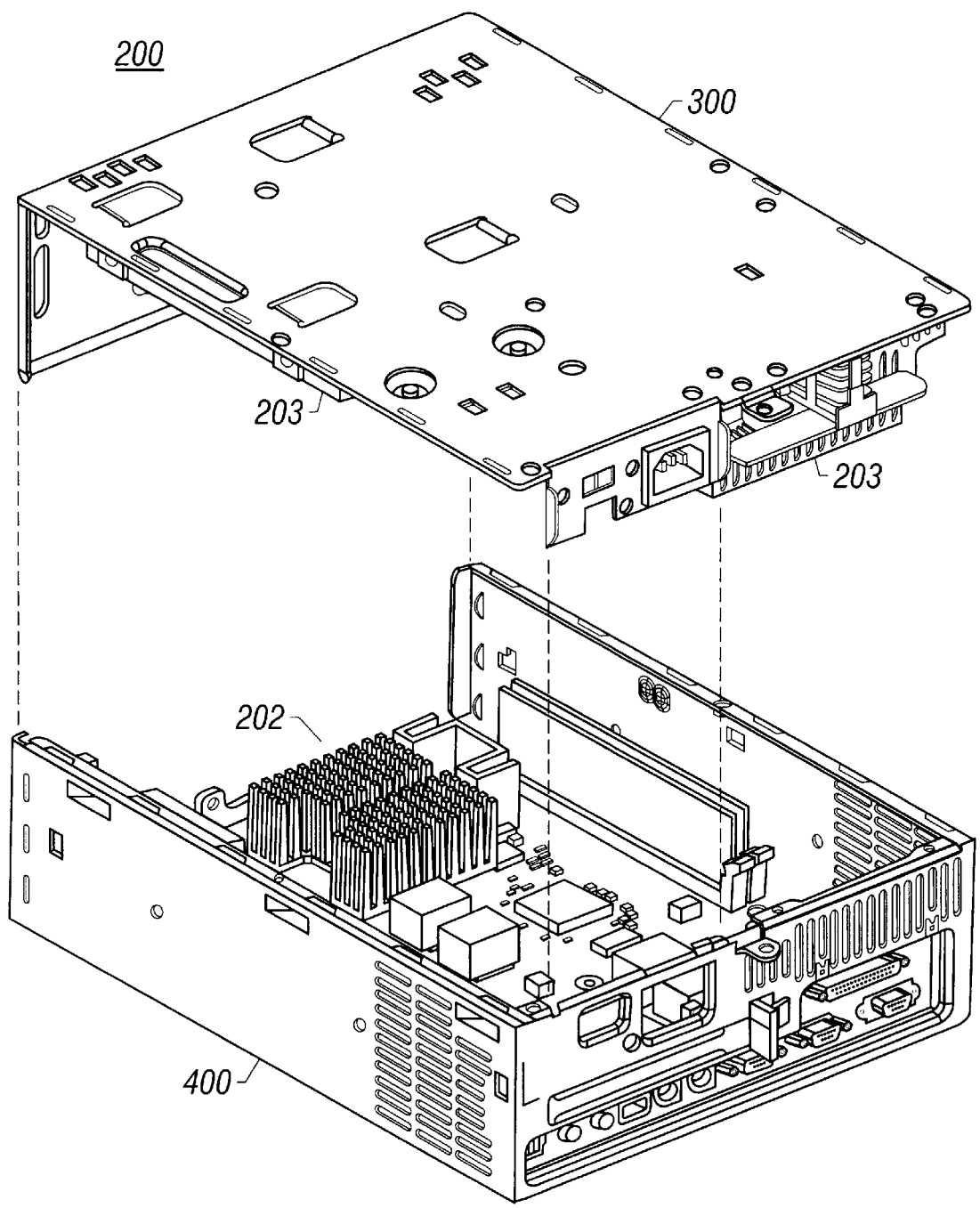
FIG. 2 is an assembly view of a chassis in accordance with one embodiment of the invention.

Referring to FIG. 2, the chassis 200 includes a top frame 300 and a bottom frame 400. Electronic components are mounted on the top frame 300 and on the bottom frame 400, e.g., components 202 and 203. The top frame 300 and the bottom frame 400 may be attached together to define a computer system enclosure (a chassis) for the electronic components 202 and 203.

Figure 3:
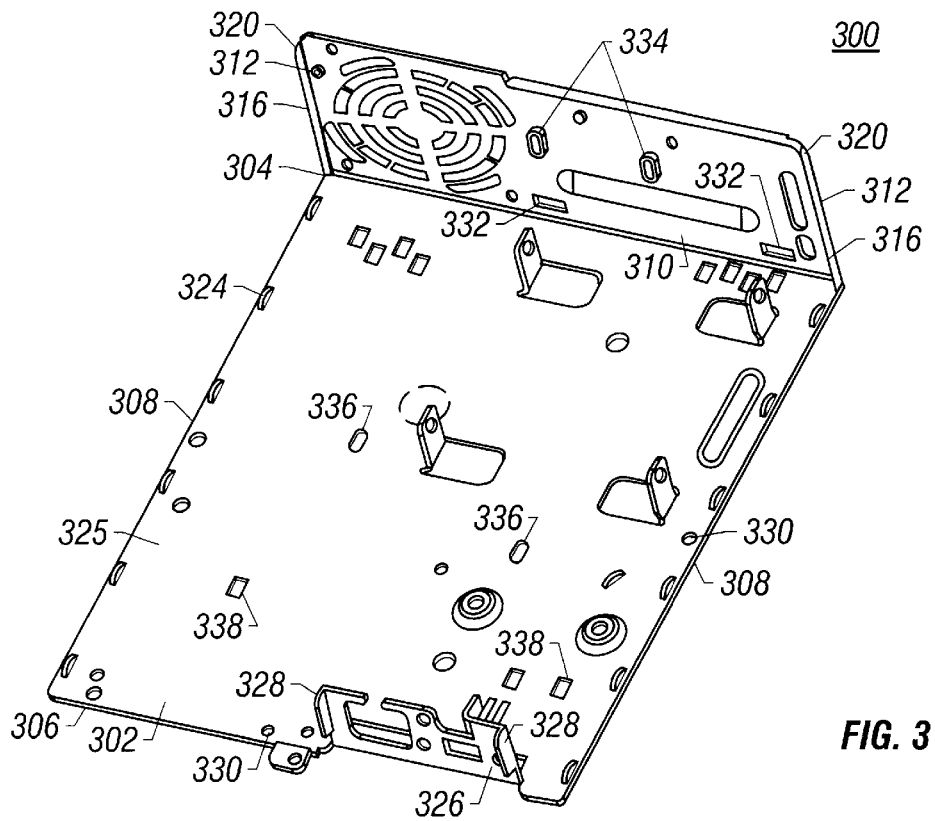
FIG. 3 is a bottom view of one part of the chassis shown in FIG. 2.

Referring to FIG. 3, the top frame 300 includes a top wall 302 which has a front edge 304, a rear edge 306, and side edges 308. A front wall 310 projects from the front edge 304. The front wall 310 has side edges 312. Flanges 316 are formed on the side edges 312. The flanges 316 terminate in bent lips 320.

Guide elements, e.g., shear forms 324, are formed on an inner surface 325 of the top wall 302. The shear forms 324 are aligned and arranged proximate the side edges 308. A rear wall 326 projects from the rear edge 306 of the top wall 302. The rear wall 326 has flanged side edges 328.

Figure 4:
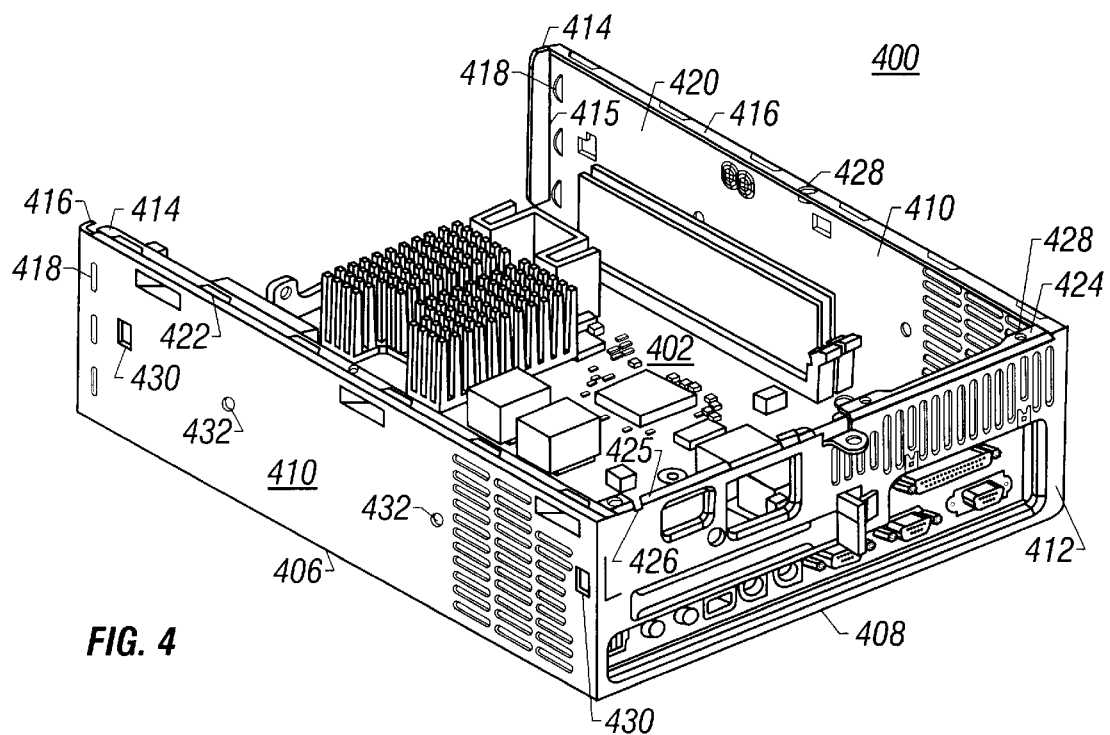
FIG. 4 is a perspective view of another part of the chassis shown in FIG. 2.

Referring to FIG. 4, the bottom frame 400 includes a bottom wall 402 which has a front edge 404, side edges 406, and a rear edge 408. A pair of side walls 410 and a rear wall 412 extend upwardly from the bottom wall 402. The side walls 410 have side flanges 414 and top flanges 416.

Guide elements, e.g., shear forms 418, are formed on the inner surfaces 420 of the side walls 410. The shear forms 418 are positioned adjacent the side flanges 414. The shear forms 418 are aligned such that guide channels 415 are defined between the flanges 414 and the shear forms 418. The guide channels 415 are arranged to slidably receive the flanges 316 on the front wall 410 of the top frame 400.

The top flanges 416 include slots 422 for receiving the shear forms 324 on the inner surface 325 of the top wall 302. The upper end 424 of the rear wall 412 includes flanges 425 and openings 426 which are aligned to receive the flanged edges 328 of the rear wall (shown in FIG. 3).

Referring now to FIGS. 2–4, the chassis 200 is assembled by aligning the flanges 316 on the front wall 310 of the top frame 300 with the guide channels 415 defined between the shear forms 418 and the flanges 414 on the side walls 410 of the bottom frame 400. The flanged edges 328 of the rear wall 326 are also aligned with the openings 426 in the rear wall 412 of the bottom frame 400. The top frame 300 may then be released to allow the flanges 316 to slide into the guide channels 415 and the flanged edges 326 to slide through the openings 426. The flanges 414 and spacers 418 and openings 426 maintain proper alignment of the front wall 310 and rear wall 326, respectively, with respect to the side walls 410 so that electronic components attached to the top and bottom frames are not damaged. Screws may be inserted through holes 330 in the top frame 300 and holes 428 in the bottom frame 400 to secure the top and bottom frames together.

Figure 5:
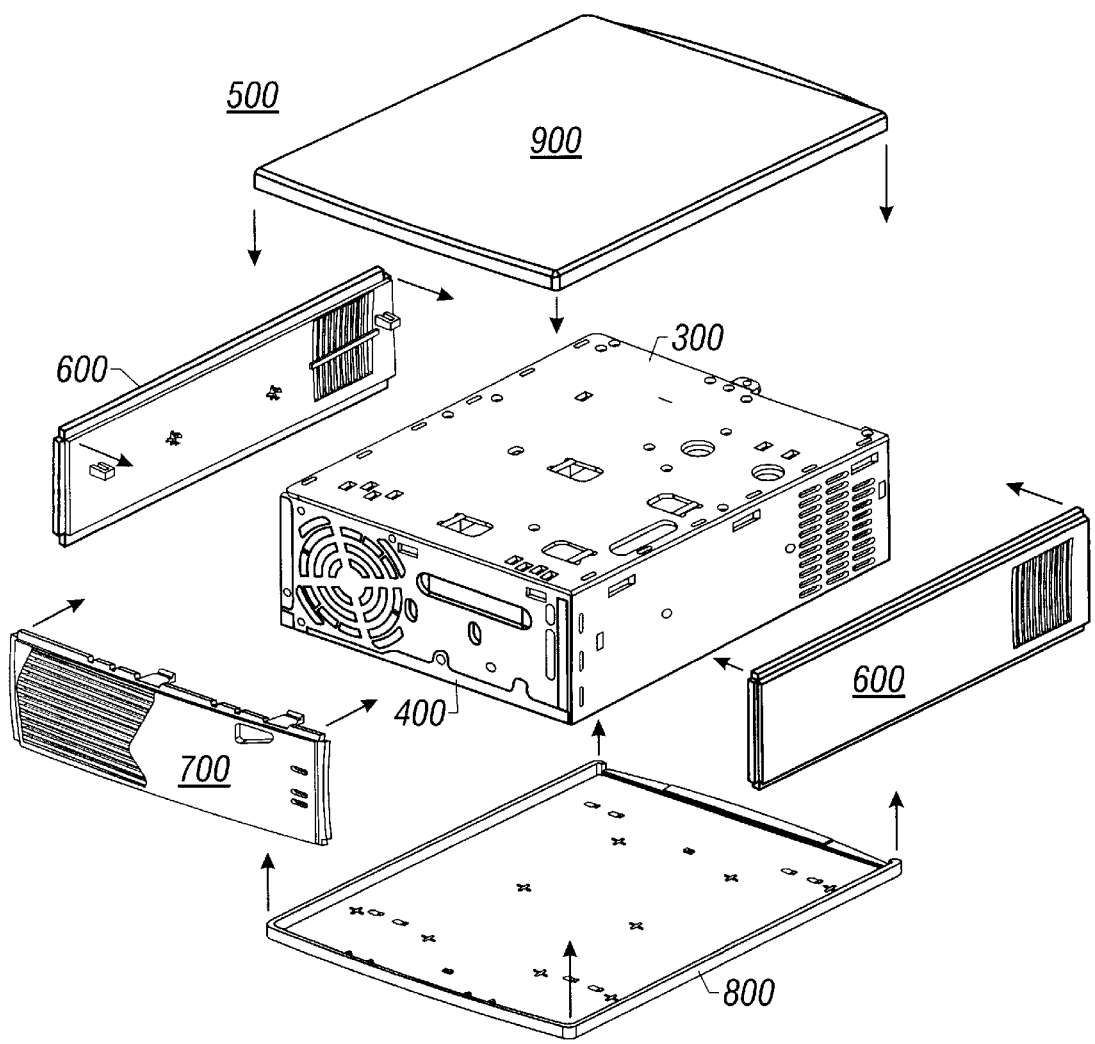
FIG. 5 is an assembly view of a portion of the illustrative system shown in FIG. 1.

Referring to FIG. 5, the cover assembly 500 includes side panels 600, front panel 700, bottom panel 800, and top panel 900.

Figure 6:
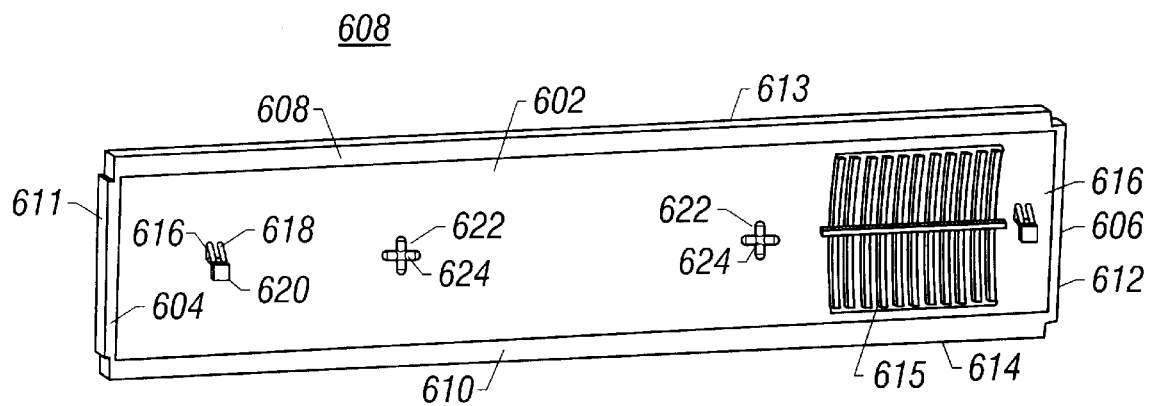
FIG. 6 shows the inner side of a side panel in accordance with one embodiment of the invention.

Referring to FIG. 6, each side panel 600 has an inner surface 602, a front edge 604, a rear edge 606, a top edge 608, and a bottom edge 610. Lips 611, 612, 613, and 614 are formed on the edges 604, 606, 608, and 610, respectively. Vents 615 are provided in the side panel 600 to allow for air flow.

A pair of hooks 616 project from the inner surface 602. The hooks 616 have leg portions 618 and arm portions 620. The arm portions 620 may be inserted into slots 430 (shown in FIG. 4) in any one of the side walls 410 of the bottom frame 400.

A pair of standoffs 622 are formed on the inner surface 602. The standoffs 622 project from the inner surface 602 in the same direction that the hooks 616 project from the inner surface 602. The outer ends 624 are arranged to mate with apertures 432 (shown in FIG. 4) in the side wall 410 of the chassis so that the side panel 600 is properly aligned with the side wall 410 of the chassis.

The standoffs 622 are slightly longer than the leg portions 618 of the hooks 616, thus placing the side panel 600 in tension when the arms 620 engage the chassis. The tensioned side panel 600 acts as a loaded spring which applies tension to the hooks 616 and enables the hooks 616 to firmly engage the side wall 410.

Figure 7:
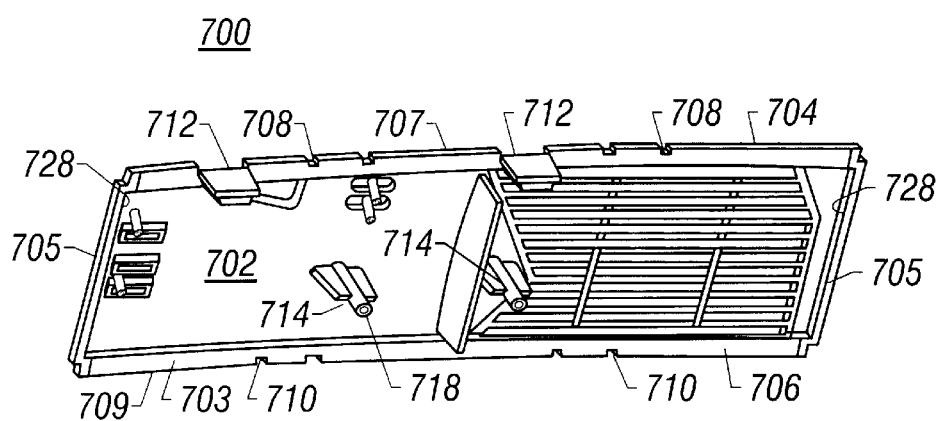
FIG. 7 shows the inner side of a front panel in accordance with one embodiment of the invention.

Referring to FIG. 7, the front panel 700 has a first surface 702 and a second surface 703 which surrounds the first surface 702. The first surface 702 is recessed with respect to the second surface 703. The front panel 700 also has a top edge 704, side edges 704, and a bottom edge 706. Lips 707 and 709 are formed on the top edge 704 and bottom edge 706, respectively. Grooves 708 and 710 are formed in the top edge 704 and bottom edge 706, respectively. A pair of hooks 712 are formed on the first surface 702. The hooks 712 are arranged to engage slots 332 (shown in FIG. 3) in the front wall 310 of the top frame 300.

A pair of spacers 714 are formed on the first surface 702 of the front panel 700. The spacers 714 provide a desired spacing between the first surface 702 and the front wall 310 of the chassis (shown in FIG. 3). The spacers 714 have protruding portions 718 which are arranged to engage apertures 334 (shown in FIG. 3) in the front wall 310 of the chassis.

Figure 8:
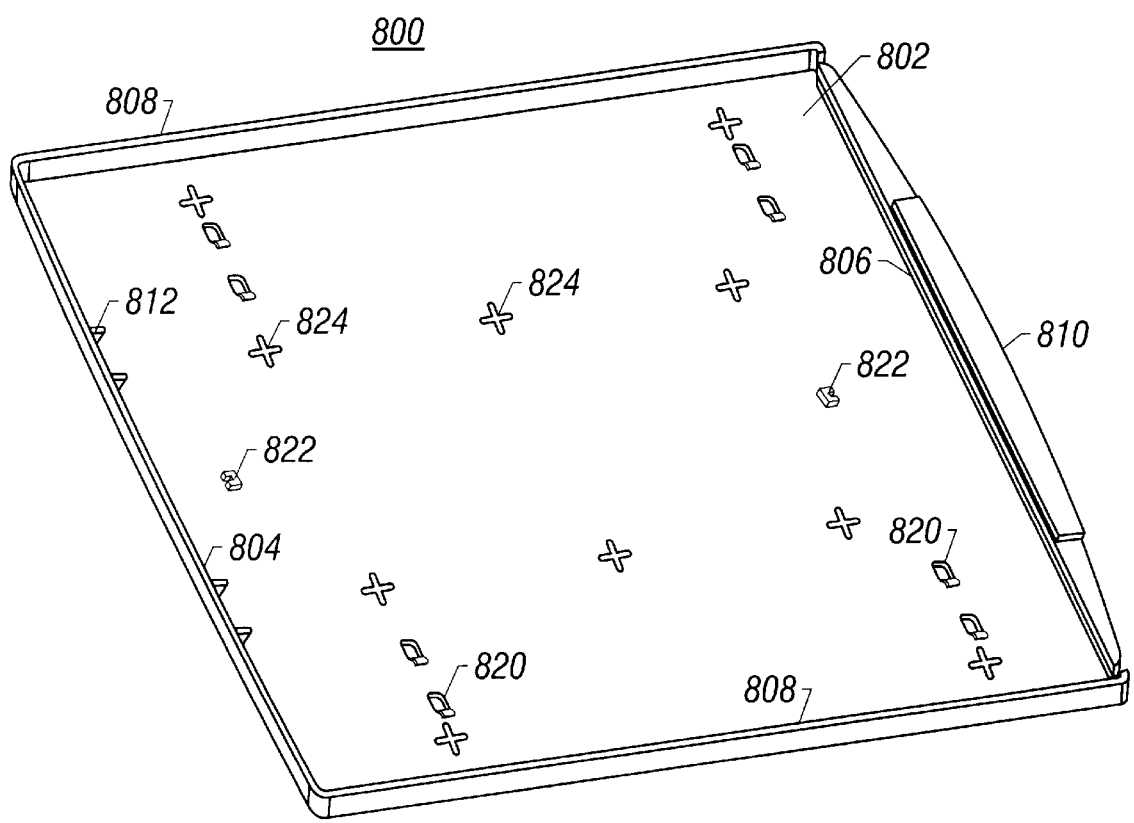
FIG. 8 shows the inner side of a bottom panel in accordance with one embodiment of the invention.

Referring to FIG. 8, the bottom panel 800 includes an inner surface 802, a front edge 804, rear edge 806, and side edges 808. The front edge 804 and the side edges 808 are flanged and a curved lip 810 is formed on the rear edge 806. Ridges 812 project from the inner surface 802. The ridges 812 may mate with the grooves 710 (shown in FIG. 7) on the bottom edge 706 of the side panel 700.

A plurality of hooks 820 project from the inner surface 802. The hooks 804 may be inserted into apertures (not shown) in the bottom wall 402 (shown in FIG. 4) of the bottom frame 400. A pair of standoffs 822 are formed on the inner surface 802. The upper ends of the standoffs 822 are arranged to engage slots (not shown) in the bottom wall 402 (shown in FIG. 4) of the bottom frame 400.

A plurality of spacers 824 are formed on the inner surface 802. The spacers 824 provide a desired spacing between the bottom wall 402 of the chassis and the inner surface 802. The spacers 824 are slightly shorter than the standoffs 822, thus allowing the bottom panel 800 to act as a loaded spring. This has the combined effect of placing the hooks 820 in tension and allowing the hooks 820 to firmly engage the chassis.

Figure 9:
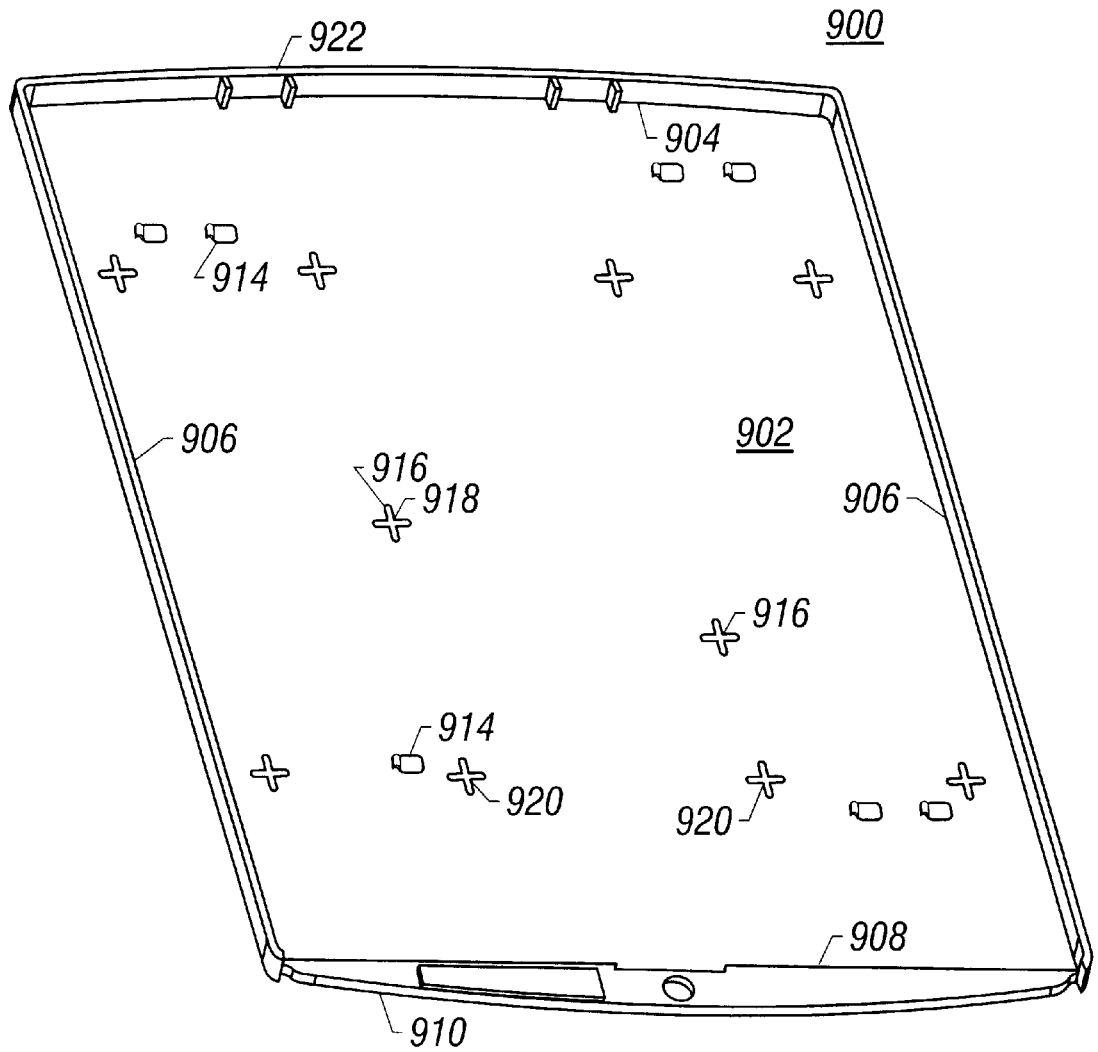
FIG. 9 shows the inner side of a top panel in accordance with one embodiment of the invention.

Referring to FIG. 9, the top panel 900 includes an inner surface 902 and front edge 904, side edges 906, and rear edge 908. The front edge 904 and side edges 906 are flanged while the rear edge 908 includes a curved lip 910. A plurality of hooks 914 project from the inner surface 902. The hooks 914 may be inserted into slots 338 (shown in FIG. 3) in the top wall 302 of the chassis. A pair of standoffs 916 are formed on the inner surface 902. The outer ends 918 of the standoffs 916 are arranged to engage apertures 336 (shown in FIG. 3) in the top wall 302 of the chassis.

A plurality of spacers 920 are formed on the inner surface 902. The spacers 920 are formed on the inner surface 902. The spacers 920 provide a desired spacing between the top wall 302 of the chassis and the inner surface 902. The standoffs 916 are slightly longer than the spacers 920 so that the top panel 900 acts as a loaded spring which places the hooks 914 in tension.

Figure 10:
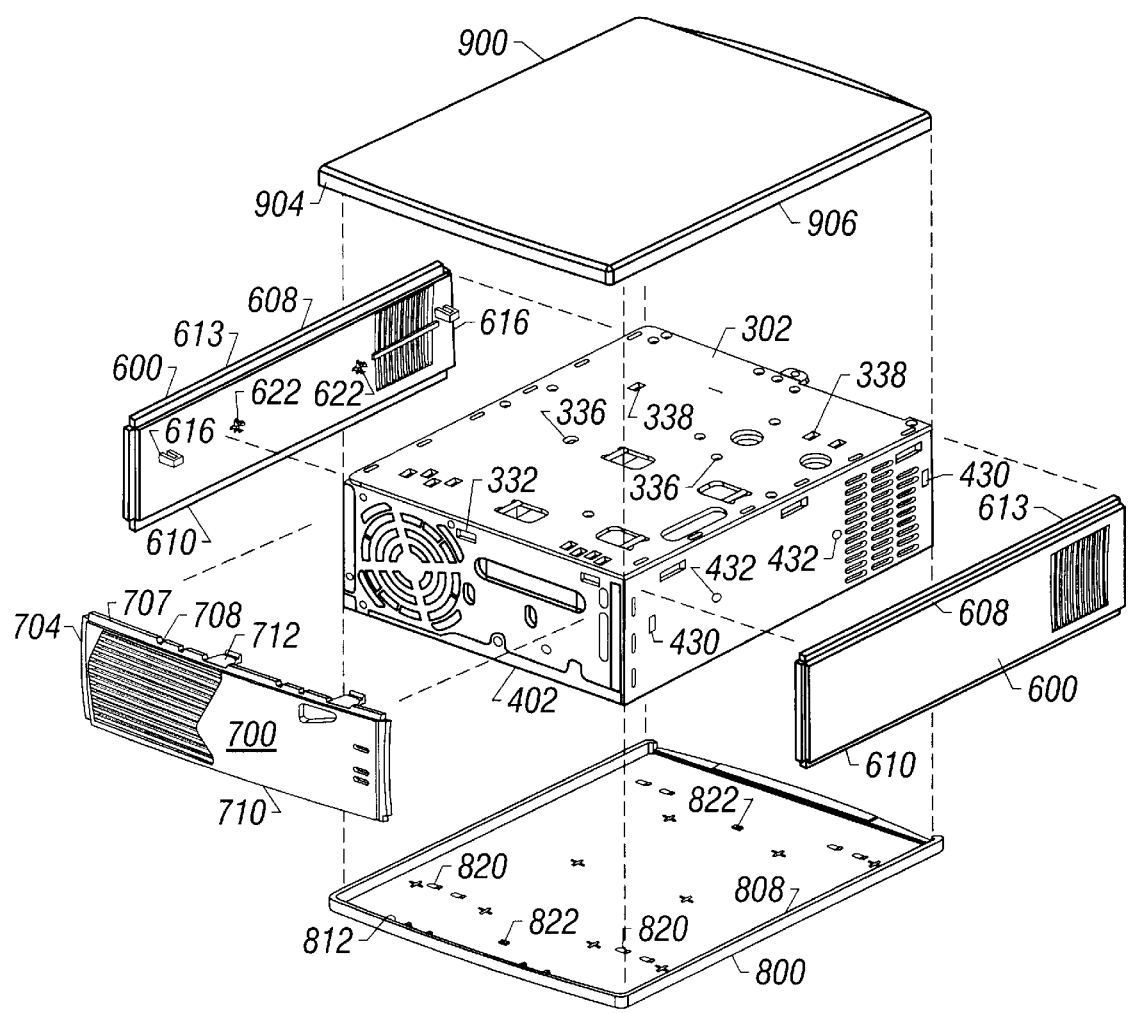
FIG. 10 is an assembly view of the illustrative computing system shown in FIG. 1.

Referring to FIG. 10, the cover 600 is secured to the chassis 200 by inserting the hooks 616 in the side panels 600 into slots 430 in the side walls 410 of the chassis. The upper ends of the standoffs 622 are fitted against the apertures 432 so that the side panels 600 are properly aligned with the side walls 410 when the hooks engage the side walls 410. The standoffs 622 also place the hooks 616 under tension so that the hooks 616 firmly engage the sidewalls 410.

The bottom panel 800 is then secured to the bottom wall 402 by aligning the side edges 808 with the bottom edges 610 of the side panels 600 and sliding the bottom panel 800 from the front of the chassis to the back until the hooks 820 engage slots (not shown) in the bottom wall 402. The standoffs 822 are also fitted against apertures (not shown) in the bottom wall 402. The lips 614 at the bottom edges 610 of the side panels 600 mate with the flanged side edges 808, thus forming interlocking joints between the side panels 600 and the bottom panel 800.

The front panel 700 is secured to the front wall 310 by fitting the grooves 710 to the ridges 812 on the bottom panel 800 and then swinging the front panel 700 toward the front wall 310 to allow the hooks 712 to engage the slots 332 in the front wall 310. The lips 611 on the front edges 604 of the side panels 600 mate with surfaces 728 (shown in FIG. 7) between the first surfaces 702 and the second surfaces 703 of the front panel 700, thus forming interlocking joints between the side panels 600 and the front panel 700.

The top panel 900 is secured to the top wall 302 by aligning the side edges 906 with the top edges 608 of the side panels 600 and sliding the top panel 900 until the hooks 914 (shown in FIG. 9) engage the slots 338 in the top wall 302 and the standoffs 916 (shown in FIG. 9) fit against the apertures 336 in the top wall 302. The ridges 922 (shown in FIG. 9), which are located adjacent the front edge 904 of the top panel 900, mate with the grooves 708 in the top edge of the front panel 700 when the top panel 900 is slid in place.

The lips 613 on the top edges 608 of the side panels mate with the side edges 906. The lip 707 on the top edge 704 of the front panel 700 mates with the front edge 904 of the top panel 900 when the top panel 900 is slid in place. This allows interlocking joints to be formed between the top panel and the front and side panels.

Figure 11:
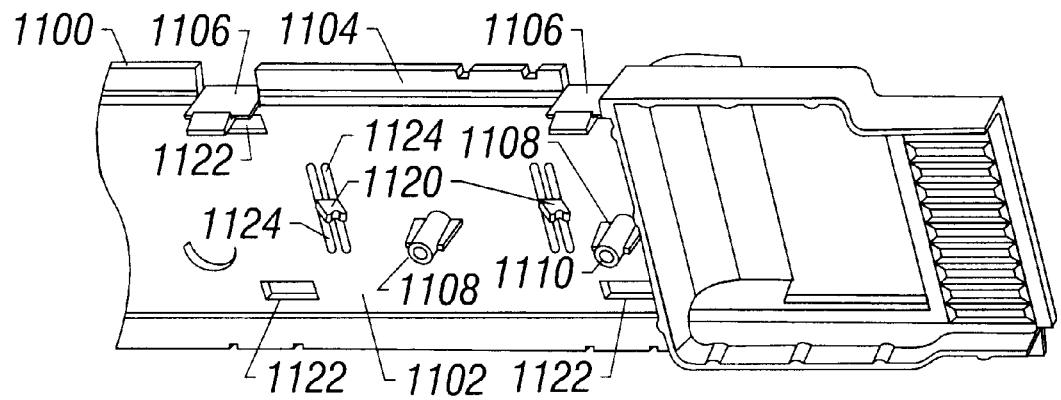
FIG. 11 is a perspective view of a panel adapter in accordance with one embodiment of the invention.
Figure 12:
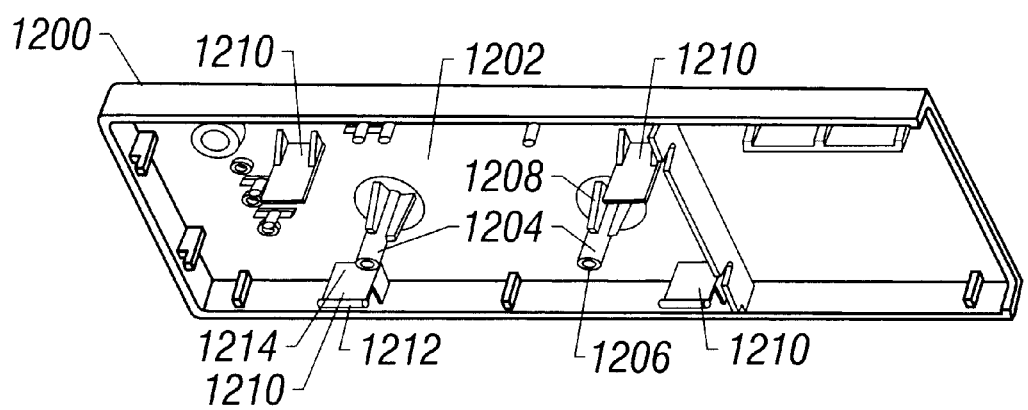
FIG. 12 is a perspective view of a cover panel in accordance with one embodiment of the invention.

In an alternative embodiment, the front panel 700 may be replaced with a two-piece front panel which comprises a panel adapter 1100 (shown in FIG. 11) and a cover panel 1200 (shown in FIG. 12).

Referring now to FIG. 11, the adapter 1100 has an inner surface 1102 and a top edge 1104. A pair of hooks 1106 are formed on the top edge 1104. The hooks 1104 may engage the slots 332 (shown in FIG. 3) in the front wall 310 of the top frame 300. A pair of spacers 1108 project from the inner surface 1102. The spacers 1108 have protruding portions 1110 which may engage apertures 334 (shown in FIG. 3) in the front wall 310 of the top frame 300. The spacers 1108 are arranged to provide a desired spacing between the front wall 310 and the inner surface 1102. A pair of slots 1120 and a plurality of slots 1122 run through the adapter 1100. A pair of cantilevers 1124 have free ends which project into the slots 1120 and are spaced apart to define an aperture 1124.

Referring to FIG. 12, the cover panel 1200 has an inner surface 1202 and a pair of standoffs 1204 projecting from the inner surface 1202. The standoffs 1204 have protruding portions 1206 and fins 1208. A plurality of hooks 1210 are formed on the inner surface 1202. The hooks 1210 have arm portions 1212 and leg portions 1214.

Referring now to FIGS. 11 and 12, the cover panel 1200 may be mounted on the adapter 1100 by aligning the protruding portions 1206 of the standoffs 1204 with the apertures 1124 in the adapter 1100. Then the cover panel 1200 and adapter 1100 may be pressed together to allow the arm portions 1212 of the hooks 1208 to slide into the slots 1122 and engage the adapter 1100. The fins 1208 contact the cantilevers 1124 when the cover panel 1200 is attached to the adapter 1100. The cantilevers 1124 act as semi-flexible members to maintain a tension between the adapter 1100 and the cover panel 1200.

The panels may be molded from a plastic resin, e.g. a thermoplastic alloy of polycarbonate and acrynolite, butadiene, and styrene.

What is claimed is:

1. A cover assembly, comprising:

a chassis having a first slot;

a panel having a first inner surface and a hook, said hook adapted to engage said slot under tension; and a standoff projecting perpendicular from the panel and extending a first distance, the standoff adapted to place said hook under tension when said hook is engaged in said slot and said standoff engages said chassis wherein said hook has a leg portion projecting from said inner surface and an arm portion connected to a distal end of said leg portion and insertable into the first slot, said hook projecting perpendicular from said inner surface a second distance, said first distance being greater than said second distance.

2. The cover assembly of claim 1, wherein the hook is formed on the first inner surface.

3. The cover assembly of claim 1, wherein the hook is formed on a peripheral edge of the panel.

4. The cover assembly of claim 3, wherein the panel is provided with a second slot and a pair of opposing cantilevers.

5. The cover assembly of claim 4, wherein the cantilevers are formed by notching a surface of the panel.

6. The cover assembly of claim 4, further comprising:

a second panel having a second inner surface, including:
    a second hook formed on the second inner surface, the second hook having an arm portion insertable into the second slot; and
    a second standoff formed on the second inner surface, the second standoff having fins and a protruding portion insertable into a space between the cantilevers, the fins contacting the cantilevers when the hook is inserted into the slot.

7. A chassis assembly comprising:

a chassis having a plurality of walls connected to define an enclosure;

a plurality of panels each having an inner surface, defined peripheral edges, and a hook, the hook having a leg portion and an arm portion, the arm portion being insertable into a slot in one of the walls of the chassis; and a standoff formed on each inner surface, the standoff having a length longer than a length of the leg portion, such that said standoff is adapted to place said hook in tension when said hook is engaged in a slot in one of the walls of the chassis and when said standoff is engaging one of the walls of said chassis wherein interlocking joints are formed between abutting panels and wherein the interlock joints comprise lips on the peripheral edges of the panels.

* * * * *

UNITED STATES PATENT AND TRADEMARK OFFICE
CERTIFICATE OF CORRECTION

PATENT NO. : 6,027,191
DATED : February 22, 2000
INVENTOR(S) : George Korinsky, Craig Crawford, Jennifer Colley and Anthony G. Picardo It is certified that error appears in the above-identified patent and that said Letters Patent is hereby corrected as shown below:

In column 6, line 47, please replace "interlock" with --interlocking--.

Signed and Sealed this

Thirteenth Day of February, 2001

Attest:

NICHOLAS P. GODICI

*Attesting Officer*     *Acting Director of the United States Patent and Trademark Office*